(12) United States Patent
Yin et al.

(10) Patent No.: US 11,600,100 B2
(45) Date of Patent: Mar. 7, 2023

(54) IMAGE SENSING METHOD

(71) Applicant: Guangzhou Tyrafos Semiconductor Technologies Co., Ltd., Guangzhou (CN)

(72) Inventors: Ping-Hung Yin, Taipei (TW); Jun-Wen Chung, Tainan (TW); Hua Chen, Keelung (TW); Fu-Kuo Lin, New Taipei (TW); Hsu-Wen Fu, Kaohsiung (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 17/460,401

(22) Filed: Aug. 30, 2021

(65) Prior Publication Data

US 2022/0083759 A1   Mar. 17, 2022

Related U.S. Application Data

(60) Provisional application No. 63/078,356, filed on Sep. 15, 2020.

(51) Int. Cl.
*G06V 40/13*    (2022.01)
*G06F 3/042*    (2006.01)
*G06F 3/041*    (2006.01)
*G06V 40/40*    (2022.01)

(52) U.S. Cl.
CPC ........ *G06V 40/1318* (2022.01); *G06F 3/0412* (2013.01); *G06F 3/0421* (2013.01); *G06V 40/40* (2022.01)

(58) Field of Classification Search
CPC ............... G06V 40/1318; G06V 40/40; G06V 40/1382–1394; G06F 3/0412; G06F 3/0421
See application file for complete search history.

(56) References Cited

U.S. PATENT DOCUMENTS

2007/0014443 A1\* 1/2007 Russo ................ G06V 40/1388
382/124
2013/0058544 A1\* 3/2013 Sayac ................ G06V 40/1388
382/124

(Continued)

*Primary Examiner* — Stephen G Sherman
(74) *Attorney, Agent, or Firm* — Lin & Associates Intellectual Property, Inc.

(57) ABSTRACT

An image sensing method, applicable to the anti-spoofing recognition of under screen optical fingerprint sensing, is provided, including: dividing the image sensor into sensing blocks, dividing the display area of the display device correspondingly according to the sensing area, and the display area including the light-emitting area; defining the luminous color of each display area and the color coordinate value of each luminous color; each sensing block sensing the light intensity of the image reflected to the sensing block from the display block emitting the light onto the reference object and the test object to be measured; calculating the anti-spoofing reference color information of the reference object and registering in the system; when sensing the fingerprint image, first obtaining the light intensity of each block, then calculating the color information of the test object; and finally, comparing the color information with the registered anti-spoofing reference color information.

9 Claims, 10 Drawing Sheets

(56) References Cited

U.S. PATENT DOCUMENTS

| | | | | |
|---|---|---|---|---|
| 2014/0153791 | A1* | 6/2014 | Kim | G06V 40/1394 |
| | | | | 382/124 |
| 2018/0129857 | A1* | 5/2018 | Bonev | G06V 40/1365 |
| 2018/0349721 | A1* | 12/2018 | Agrawal | G06V 40/45 |
| 2021/0174105 | A1* | 6/2021 | He | G06V 10/42 |

* cited by examiner

IMAGE SENSING METHOD

CROSS-REFERENCE TO RELATED APPLICATION

This application claims the priority of U.S. provisional patent application No. 63/078,356, filed on Sep. 15, 2020, which is incorporated herewith by reference.

BACKGROUND OF THE INVENTION

1. Field of the Invention

The present invention relates generally to an image sensing method, and more particularly to an image sensing method applicable to fingerprint image recognition.

2. The Prior Arts

Since the development of fingerprint recognition technology, it has become the standard part of most smart phones. The advantage of fingerprint recognition is that the fingerprint is a unique feature of the human body, and the complexity of the fingerprint is sufficient for authentication. Moreover, when the reliability needs to be increased, it is only necessary to register more fingerprints and identify more fingers, say, up to ten fingerprints, and each fingerprint is unique. Furthermore, scanning fingerprints nowadays is very fast and easy to use, which is one of the main reasons that fingerprint recognition technology can dominate the market share.

Under-screen optical fingerprint recognition is currently widely used in AMOLED displays, but the under-screen optical fingerprint recognition may also be applied to LCD displays with LED backlights, and so on in the future because various types of panels are available for projecting the light to the position where the finger touches the panel, and the reflected light is received by the sensor for fingerprint recognition, which greatly enhances the application range and applicability of under-screen optical fingerprint recognition.

However, fingerprint recognition is not absolutely safe. People leave their fingerprints in many publicly visited places every day. It is really easy to obtain a copy of fingerprint. Once the fingerprint is obtained, personal devices and information security may be breached. At the same time, compared to using a password, the password protection can be reset even if the password is cracked, but the fingerprint cannot be reset.

At present, many anti-spoofing methods have been proposed, such as, using infrared light sources to detect finger capillaries or using the three-dimensional characteristics of the finger to perform peripheral calculation, or fabricating color filter layers or polarized light layer on the pixels of optical sensors for comparison. However, in many of the above methods, the addition of the infrared light source or increase the optical film layer results in an increase in the production cost. Therefore, how to achieve high-performance anti-spoofing fingerprint recognition without increasing the production cost of the fingerprint recognition module is an important issue.

Therefore, to address the above-mentioned deficiencies, the inventors disclosed the present invention.

SUMMARY OF THE INVENTION

A primary objective of the present invention is to provide an image sensing method, which confirms whether the fingerprint comes from a real finger of a holder of the registered fingerprint through the specific skin color expressed by the absorption and reflection of specific wavelengths of light by the skin. Thus, according to the image sensing method of the present invention, it is possible to provide high-efficiency anti-spoofing recognition without increasing the production cost of the anti-spoofing recognition module.

To achieve the foregoing objective, the present invention provides an image sensing method, which divides the image sensor into one or more sensing blocks, and divides the display device into correspondingly one or more display blocks according to the sensing blocks, so that each sensing block respectively senses the image light intensity of the image reflected to the sensing block generated by a different display block irradiates light onto a reference object and a test object, and defines color coordinate values of each luminous color of the display block, the image light intensity and the color coordinate values are combined to obtain the anti-spoofing reference color information of the reference object and the color information of the test object, and the color information is compared with the anti-spoofing reference color information. For anti-spoofing recognition of fingerprint recognition applied to the under screen of a display device, the display device has a display panel and an image sensor, the display panel has a display area, the image sensor correspondingly overlaps the display area. The image sensing method includes the following steps: dividing step: dividing the image sensor into a plurality of sensing blocks; corresponding step: correspondingly dividing the display area into a plurality of display blocks according to a plurality of sensing blocks, the display block comprising at least one light-emitting block, the area of the light-emitting block being smaller than the area of the sensing block; defining step: defining a luminous color of each display block and a color coordinate value of the luminous color; reference sensing step: the plurality of display blocks emitting light at the same time, and then each of the sensing blocks sensing a reference image light intensity of the light reflected to the sensing blocks from each of the display blocks emitting light unto a reference object and reflected to the sensing blocks; reference color calculation step: generating an anti-spoofing reference color information from the color coordinate value and the reference image light intensity; registration step: registering the anti-spoofing reference color information into a system, and using the anti-spoofing reference color information to generate an anti-spoofing reference interval; sensing step: the plurality of display blocks emitting light at the same time, and the sensing blocks obtaining an image light intensity of an image reflected to the sensing blocks from the display blocks emitting light unto and reflected by a test object; calculation step: generating a color information from the color coordinate value and the image light intensity; and comparison step: determining the color information and the anti-spoofing reference color information being consistent when the color information being within the anti-spoofing reference interval, otherwise determining the color information being inconsistent with the anti-spoofing reference color information.

Preferably, according to the image sensing method of the present invention, the light-emitting block comprises a first light-emitting block and a second light-emitting block, and the luminous color of the first light-emitting block is selected from one of red light, green light, and blue light, and the luminous color of the second light-emitting block is selected from another of red light, green light, and blue light.

Preferably, according to the image sensing method of the present invention, the display area further comprises a third light-emitting block, and the luminous color of the third light-emitting block is selected from one of the red light, green light, and blue light, and the luminous color of the third light-emitting block is different from luminous colors of the first light-emitting block and the second light-emitting block.

Preferably, according to the image sensing method of the present invention, the registration step is a one-time or multiple-time registration to the system, but the present invention is not limited hereto.

Preferably, according to the image sensing method of the present invention, the anti-spoofing reference color is an average value of the anti-spoofing reference color information registered in the system, but the present invention is not limited hereto.

Preferably, according to the image sensing method of the present invention, the anti-spoofing reference interval is manually set, but the present invention is not limited hereto.

Preferably, according to the image sensing method of the present invention, the anti-spoofing reference interval is the difference between the maximum and minimum values and the average value of the anti-spoofing reference color information registered by the system, but the present invention is not limited hereto.

Preferably, according to the image sensing method of the present invention, the display panel is one of an organic light-emitting diode (OLED) display panel and a micro light-emitting diode display panel, but the present invention is not limited hereto.

Moreover, to achieve the foregoing objective, the present invention provides yet another image sensing method, applicable to anti-spoofing recognition of fingerprint recognition of the under screen of a display device, the display device having a display panel and an image sensor, the display panel having a display area, the image sensor correspondingly overlapping the display area; the image sensing method comprising the following steps: dividing step: dividing the image sensor into one or more sensing blocks; corresponding step: diving the display area into a plurality of display blocks corresponding to the sensing blocks; definition step: defining a plurality of luminous colors and the color coordinate values of the luminous colors; reference sensing step: the display blocks sequentially emitting at least two of red light, green light, and blue light, and each of the sensing blocks sensing a reference light intensity reflected to the plurality of the sensing blocks from each of the display blocks emitting sequentially unto a reference object and reflected to the sensing blocks; reference color calculation step: generating an anti-spoofing reference color information from the color coordinate value and the reference image light intensity; registration step: registering the anti-spoofing reference color information into a system, and using the anti-spoofing reference color information to generate an anti-spoofing reference interval; sensing step: the plurality of display blocks sequentially emitting at least two of red light, green light and blue light, and the sensing blocks sensing an image light intensity of an image reflected to the sensing blocks from the display blocks emitting light unto and reflected by a test object; calculation step: generating a color information from the color coordinate value and the image light intensity; and comparison step: determining the color information and the anti-spoofing reference color information being consistent when the color information being within the anti-spoofing reference interval, otherwise determining the color information being inconsistent with the anti-spoofing reference color information.

Preferably, according to the image sensing method of the present invention, the registration step is a one-time or multiple-time registration to the system, but the present invention is not limited hereto.

Preferably, according to the image sensing method of the present invention, the anti-spoofing reference color is an average value of the anti-spoofing reference color information registered in the system, but the present invention is not limited hereto.

Preferably, according to the image sensing method of the present invention, the anti-spoofing reference interval is manually set, but the present invention is not limited hereto.

Preferably, according to the image sensing method of the present invention, the absolute value of the anti-spoofing reference interval is the average value of the maximum value minus the minimum value of the anti-spoofing reference color information registered by the system, but the present invention is not limited hereto.

Preferably, according to the image sensing method of the present invention, the absolute value of the anti-spoofing reference interval is one of 1 time, 2 times, and 3 times of the standard deviation of the anti-spoofing reference color information registered by the system, but the present invention is not limited hereto.

Preferably, according to the image sensing method of the present invention, the display panel is one of an organic electroluminescence display panel, an organic light-emitting diode display panel, and a micro light-emitting diode display panel, but the present invention is not limited hereto.

In summary, the image sensing method and the display device provided by the present invention mainly consist of dividing the image sensor into one or more sensing blocks, and correspondingly dividing the display device into one or more display blocks according to the sensing blocks, so that each sensing block respectively senses the image light intensity of the image reflected to the sensing block from a different display block emitting light unto and reflected by the reference object and the test object, and defines each the color coordinate value of the luminous color of the display block, combine the image light intensity and the color coordinate value to obtain the anti-spoofing reference color information of the reference object and the color information of the test object, and compare the color information with the anti-spoofing reference color information. As such, according to the image sensing method of the present invention, it is possible to successfully provide high-efficiency anti-spoofing recognition without increasing the production cost of the anti-spoofing recognition module.

To enable those skilled in the art to understand the purpose, features, and effects of the present invention, the following specific embodiments and accompanying drawings are used to explain the present invention in detail as follows.

BRIEF DESCRIPTION OF THE DRAWINGS

The present invention will be apparent to those skilled in the art by reading the following detailed description of a preferred embodiment thereto, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
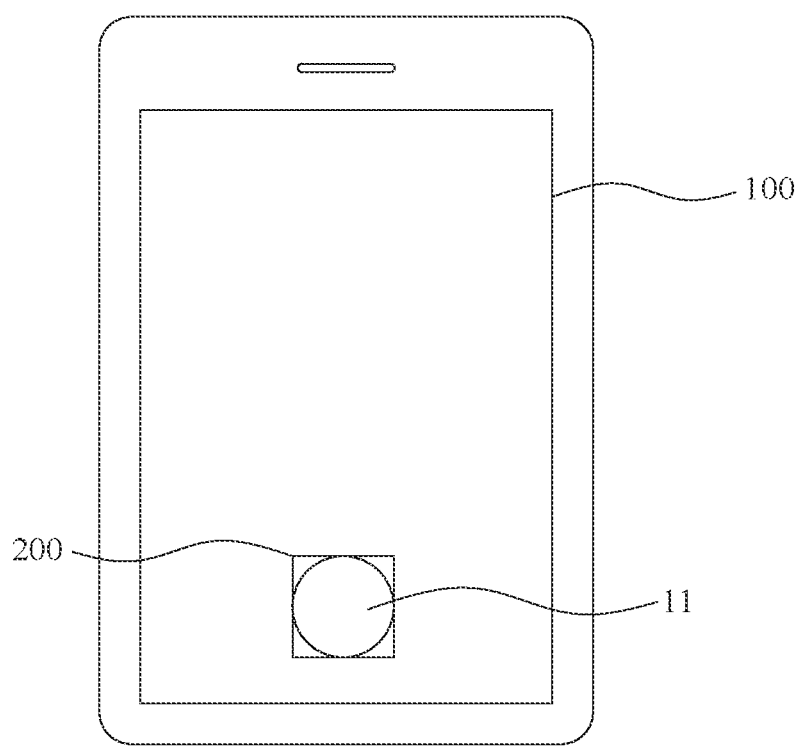
FIG. 1 is a schematic view of a display device according to the present invention.

FIG. 1 is a schematic view of a display device according to the present invention. As shown in FIG. 1, the display device 1 according to the present invention includes: a display panel 100, a display area 11, a plurality of pixel units, and an image sensor 200.

Figure 3:
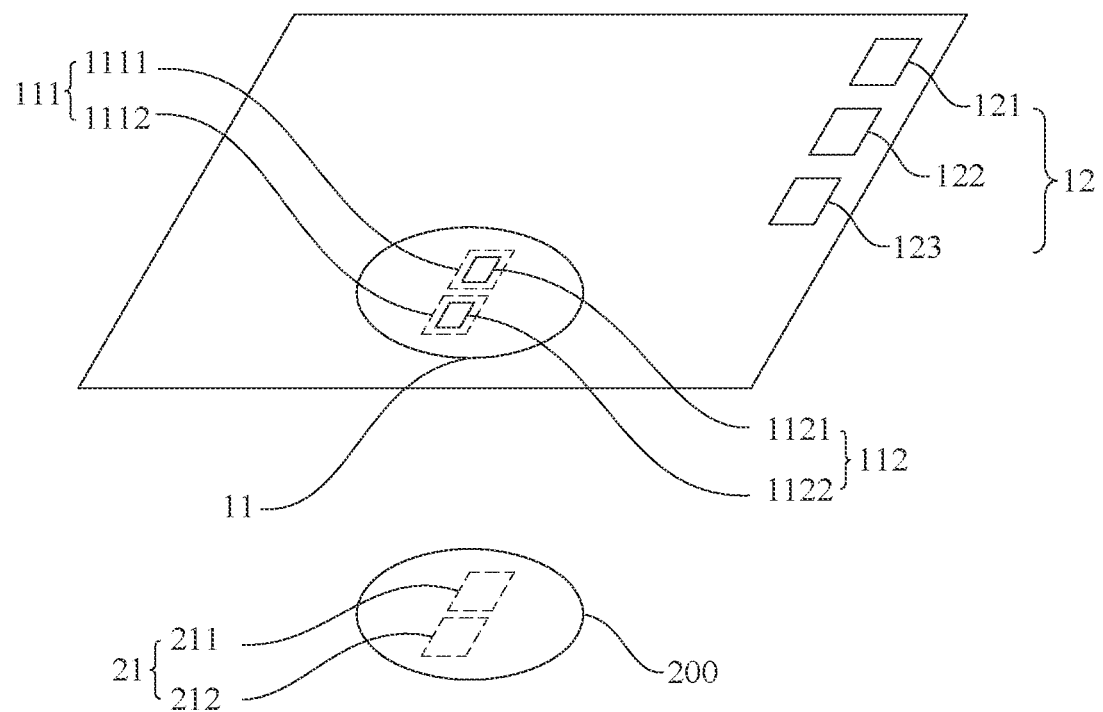
FIG. 3 is an exemplary schematic view of a display device according to the present invention.

More specifically, referring to FIG. 1 and FIG. 3, the display area 11 of the display panel 100 according to the present invention includes a plurality of unit pixels 12, and each unit pixel 12 includes a red light unit pixel 121, a green light unit pixel 122 and a blue light unit pixel 123, wherein the red light unit pixel 121 emits red light R, the green light unit pixel 122 emits green light G, and the blue light unit pixel 123 emits blue light B, but the present invention is not limited hereto.

The display panel 100 may be one of a liquid crystal display panel, an organic light-emitting diode (OLED) display panel, or a micro-LED display. However, the present invention is limited hereto.

Specifically, the wavelength of the red light R according to the present invention may be between 620 nm and 750 nm, but the present invention is not limited hereto.

Specifically, the wavelength of the green light G according to the present invention may be between 495 nm and 570 nm, but the present invention is not limited hereto.

Specifically, the wavelength of the blue light B according to the present invention may be between 450 nm and 495 nm, but the present invention is not limited hereto.

Specifically, the image sensor 200 according to the present invention is arranged on the display panel 100, the image sensor 200 correspondingly overlaps the display area 11, and the image sensor 200 may have one or more sensing blocks 21.

Specifically, referring to FIG. 1, the display area 11 includes one or more display blocks 111 corresponding to the sensing blocks 21, wherein the display block 111 includes at least one light-emitting block.

It should be further noted that the display block 112 according to the present invention may be discontinuously adjacent areas, and the display block 112 may include the collection of all areas of the unit pixels 12 in the display block 11 that emit the same color light, but the present invention is not limited hereto.

Figure 2:
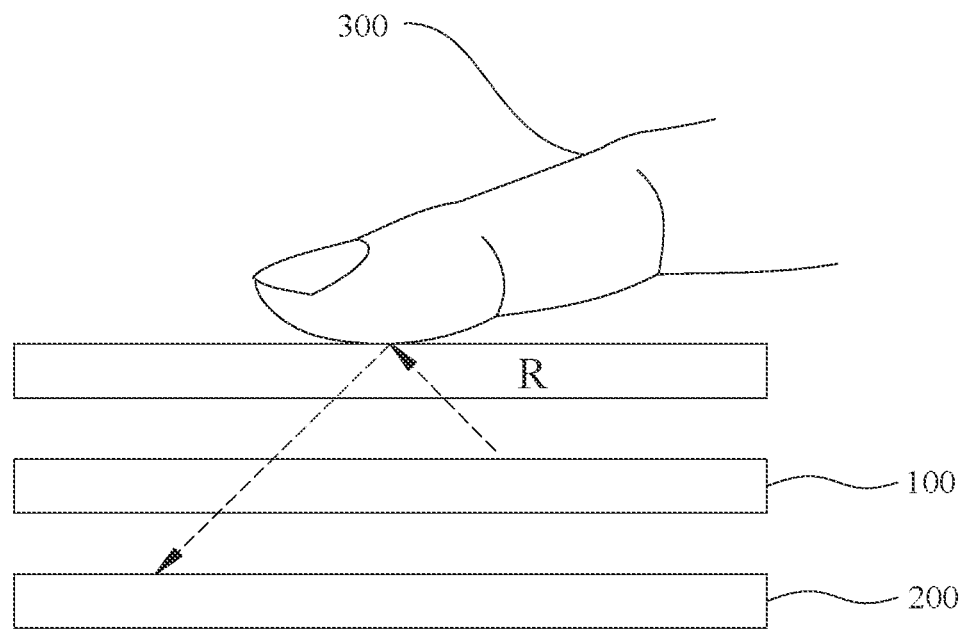
FIG. 2 is a schematic view illustrating that the light from the display block according to the present invention is reflected to the sensing block after emitting light unto the test object.

FIG. 2 is a schematic view illustrating that the light from the display block according to the present invention is reflected to the sensing block after emitted unto the test object. As shown in FIG. 2, when the test object 300 touches the display device according to the present invention, the display block 111 can emit a light R to the test object 300 through the light-emitting block 112 and the light R is reflected by the test object 300 to the sensing block 21, so that the sensing block 21 senses and generates an image light intensity.

Specifically, when the sensing block 21 senses the intensity of the image light travelled from the display block 111 to the test object 300 and then reflected to the sensing block 21, the user can define the luminous color of each display block 111 to define the color coordinate value of the luminous color of each display block 111. It should be further noted that the color coordinate values in the present specification are all expressed in CIE color coordinates, but the present invention is not limited hereto.

As such, the display device according to the present invention can combine the image light intensity sensed by each sensing block 21 and the color coordinate value of the luminous color of each display block 111 to obtain a reference image. The anti-spoofing reference color information and color information of the test object 300 are compared, and the color information is compared with the anti-spoofing reference color information, thereby providing a high-performance anti-spoofing recognition.

It should be further noted that the light-emitting block 112 may include a first light-emitting block 1121 and a second light-emitting block 1122, and the first light-emitting block emits a light selected from the group consisting of red light R, green light G, and blue light B. The second light-emitting block emits the another light selected from the group consisting of red light R, green light G, and blue light B, but the present invention is not limited hereto.

It is worth mentioning that the light-emitting block 112 may further include a third light-emitting block that emits a light selected from the group consisting of red light R, green light G, and blue light B, and the color of the light of the third light-emitting block is different from the first light-emitting block and the second light-emitting block, but the present invention is not limited hereto.

Figure 4:
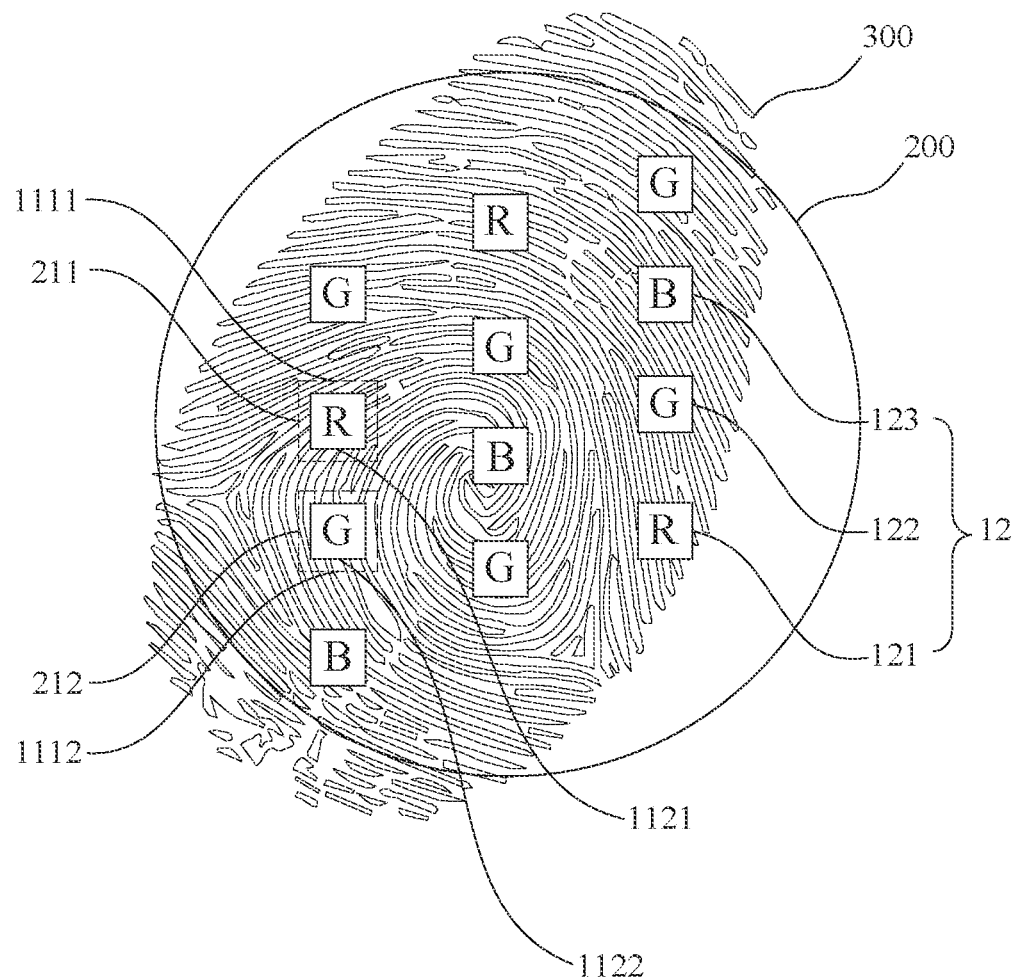
FIG. 4 is another exemplary schematic view of a display device according to the present invention.

Referring to FIG. 3 and FIG. 4, FIG. 3 is an exemplary schematic view of a display device according to the present invention; FIG. 4 is another exemplary schematic view of a display device according to the present invention. As shown in FIGS. 3 and 4, taking the image sensor 200 divided into a plurality of sensing blocks 21 as an example, the sensing blocks 21 include a first sensing block 211 and a second sensing block 212. The display area 11 of the display panel 100 is correspondingly divided into a plurality of display blocks 111 according to the sensing blocks 21. The display blocks 111 include a first display block 1111 and a second display block 1112. The first sensing block 211 corresponds to the first display block 1111, and the second sensing block 212 corresponds to the second display block 1112. It is worth mentioning that, for the convenience of description, the following description is given on the assumption that the first display block 1111 includes only the red light unit pixels 121 among the unit pixels 12, and the first sensing block 211 senses a first image light intensity of the first emitted light (not shown) emitted by the first display block 1111, reaching and reflected by the test object 300. Therefore, the first emitted light is defined as red light R, and the color coordinate value of the first emitted light is expressed by R ($x_r$, $y_r$), the first image light intensity is expressed by $I_R$, but the present invention is not limited hereto. The first display block 1111 may include one or any combination of red unit pixels 121, green unit pixels 122, and blue unit pixels 123, and the first emitted light may be a light having any wavelength.

Moreover, for the convenience of description, the second display block 1112 will only include the green unit pixels 122 of the unit pixels 12 for description, and the second sensing block 212 senses a second image light intensity of the second emitted light (not shown) emitted by the second display block 1112, reaching and reflected by the test object 300. Therefore, the second emitted light is defined as green light G, and the color coordinate value of the second emitted light is G($x_g$, $y_g$). The second image light intensity is expressed by $I_G$, but the present invention is not limited hereto. The second display block 1112 may include one or any combination of red unit pixels 121, green unit pixels 122, and blue unit pixels 123, and the second emitted light may be a light having any wavelength.

Specifically, the display device 1 according to the present invention may further include a calculation unit, which is coupled to the image sensor 200, the calculation unit uses formula (1) and formula (2) below and the first image light intensity $I_R$ and the second image light intensity $I_G$ to calculate the first light-receiving ratio a and the second light-receiving ratio b, but the present invention is not limited hereto.

$$R(a)=I_R/(I_R+I_G) \quad (1)$$

$$G(b)=I_G/(I_R+I_G) \quad (2)$$

Specifically, the calculation unit is based on the color coordinate value R($x_r$, $y_r$) of the first emitted light and the first light receiving ratio a, and the color coordinate value G($x_g$, $y_g$) of the second emitted light and the second light receiving ratio b and uses the following formula (3) and formula (4) to generate color information. The color coordinate value of the color information is represented by S(x, y), but the present invention is not limited hereto.

$$x=ax_r+bx_g \quad (3)$$

$$y=ay_r+by_g \quad (4)$$

It should be further noted that the sensing block 21 can further include a third sensing block, and the display block 111 can correspondingly include a third display block to match the third sensing block, and the third display block may only include blue unit pixels. The third display block may emit a third emitted light to the test object 300. The third emitted light is different from the first emitted light and the second emitted light. The third sensing block senses the image generated by the third emitted light to generate a third image light intensity. In terms of accuracy, when the image sensor 200 is divided into more sensing blocks 21, the sensing blocks 21 can be combined to generate a color information S(x, y) closer to the original color of the test object 300. However, it may cause increase in computational complexity and production cost at the same time, thereby causing a decrease in the recognition speed of the image sensor 200. The user can choose an appropriate division according to application needs, but the present invention is not limited hereto.

Figure 5:
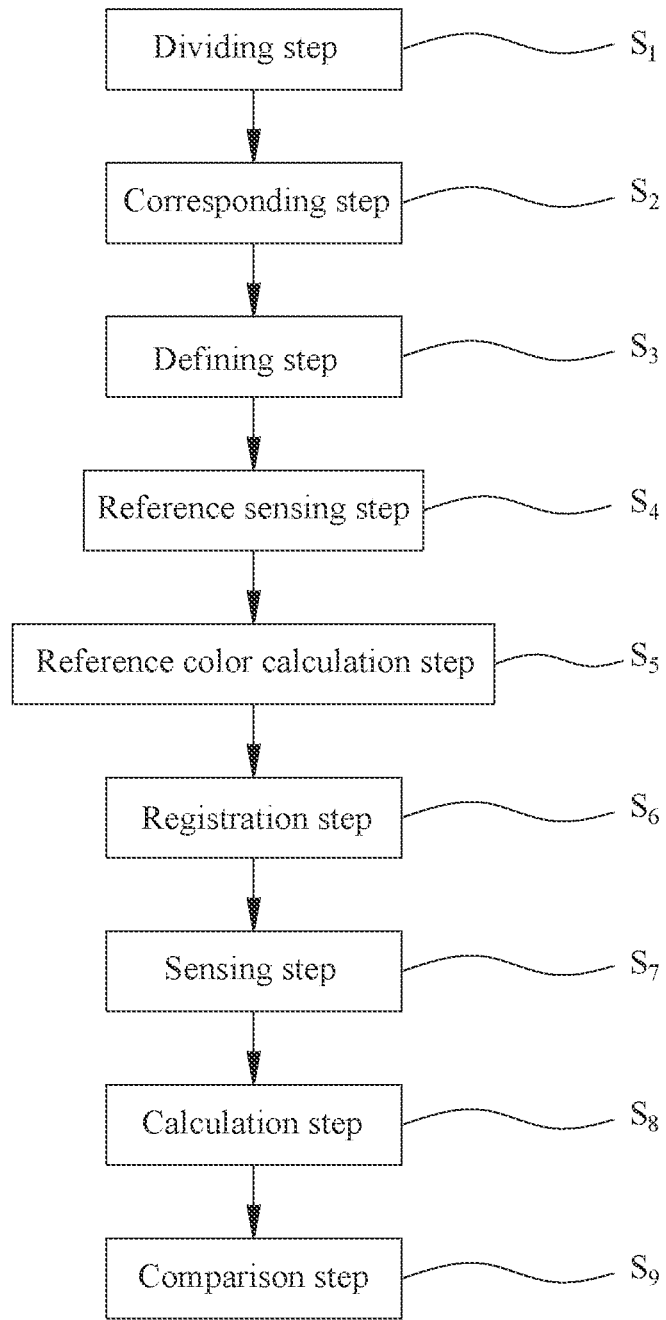
FIG. 5 is a flowchart illustrating the steps of the image sensing method of the present invention.

Refer to FIG. 5, which is a flowchart illustrating the steps of the image sensing method of the present invention. As shown in FIG. 5, the present invention further provides an image sensing method, applicable to the aforementioned display device 1. The image sensing method includes the following steps:

Dividing step $S_1$: dividing the image sensor 200 into a plurality of sensing blocks 21; and proceed to corresponding step $S_2$.

Corresponding step $S_2$: correspondingly dividing the display area 11 of the display 100 into a plurality of display blocks 111 according to a plurality of sensing blocks 21, the display block 111 comprising at least one light-emitting block 112, the area of the light-emitting block 112 being smaller than the area of the sensing block 21; and proceed to defining step $S_3$.

Defining step $S_3$: defining a luminous color of each display block 111 and a color coordinate value of the luminous color of each display block 111; and proceed to reference sensing step $S_4$.

Reference sensing step $S_4$: the plurality of display blocks 111 emitting light at the same time, and then each of the sensing blocks 21 sensing a reference image light intensity of the light reflected to the sensing blocks 21 from each of the display blocks 111 emitting light unto a reference object and reflected to the sensing blocks 21; and proceed to reference color calculation step $S_5$.

Reference color calculation step $S_5$: generating an anti-spoofing reference color information from the color coordinate value and the reference image light intensity; and proceed to registration step $S_6$.

Registration step $S_6$: registering the anti-spoofing reference color information into a system, and using the anti-spoofing reference color information to generate an anti-spoofing reference interval; and proceed to sensing step $S_7$.

Sensing step $S_7$: the plurality of display blocks 111 emitting light at the same time, and the sensing blocks 21 obtaining an image light intensity of an image reflected to the sensing blocks 21 from the display blocks 111 emitting light unto and reflected by a test object; and proceed to calculation step $S_8$.

Calculation step $S_8$: generating a color information from the color coordinate value and the image light intensity; and proceed to comparison step $S_9$.

Comparison step $S_9$: determining the color information and the anti-spoofing reference color information being consistent when the color information being within the anti-spoofing reference interval, otherwise determining the color information being inconsistent with the anti-spoofing reference color information.

For example, refer to FIG. 5, as well as FIG. 1 to FIG. 4. First, the dividing step $S_1$ is executed to divide the image sensor 200 into a plurality of sensing blocks 21. The sensing blocks 21 include the first sensing block 211 and the second sensing block 212; then the corresponding step $S_2$ is executed to divide the display area 11 of the display panel 100 correspondingly into a plurality of display blocks 111 according to the sensing blocks 21. The display block 111 includes a first display block 1111 and a second display block 1112. The first sensing area block 211 corresponds to the first display block 1111, and the second sensing block 212 corresponds to the second display block 1112. Then, the definition step $S_3$ is executed. The first display block 1111 containing only the red unit pixel 121 emits the first emitted light, defined as red light and the color coordinate value of the first emitted light as R($x_r$, $y_r$), and the second light emitted by the second display block 1112 containing only the green unit pixel 122 is defined as green light, and the color coordinate value of the second emitted light is G($x_g$, $y_g$). The reference sensing step $S_4$ is then performed. The first display block 1111 and the second display block 1112 emit light at the same time, and the first sensing block 211 senses the first reference image light intensity $I_R'$ generated by the reference object reflecting the first emitted light emitted by the first display block 1111, and the second sensing block 212 senses the second reference image light intensity $I_G'$ generated by the reference object reflecting the second emitted light emitted by the second display block 1112. Then, the reference color calculation step $S_5$ is performed, wherein the color coordinate value R($x_r$, $y_r$) of the first emitted light the color coordinate value G($x_g$, $y_g$) of the second emitted light, the first reference image light intensity $I_R'$ generated by the first sensing block 211, and the second reference image light intensity $I_G'$ generated by the second sensing block 212, are used in the calculation according to the above formula (1) to formula (4) to generate the anti-spoofing reference color information, and the color coordinate value S'(x', y') of the anti-spoofing reference color information. Then, the registration step $S_6$ is executed to register the color coordinate value S'(x', y') of the anti-spoofing reference color information to the system, and generates an anti-spoofing reference interval based on the color coordinate value S'(x', y') of the anti-spoofing reference color information. Then, the sensing step $S_7$ is executed, wherein the first display block 1111 and the second display block 1112 emit light at the same time, and the first sensing block 211 senses the first reference image light intensity $I_R$ generated by the test object 300 reflecting the first emitted light emitted by the first display block 1111, and the second sensing block 212 senses the second reference image light intensity $I_G$ generated by the test object 300 reflecting the second emitted light emitted by the second display block 1112. The calculation step $S_8$ is then performed, wherein the color coordinate value R($x_r$, $y_r$) of the first emitted light the color coordinate value G($x_g$, $y_g$) of the second emitted light, the first reference image light intensity $I_R$ generated by the first sensing block 211, and the second reference image light intensity $I_G$ generated by the second sensing block 212, are used in the calculation according to the above formula (1) to formula (4) to generate the color information, and the color coordinate value S(x, y) of the color information. Finally, in the comparison step $S_9$, when the color coordinate value S(x, y) of the color information is within the anti-spoofing reference interval, the color coordinate value S(x, y) of the color information and the color coordinate value S'(x', y') of the anti-spoofing reference color information are determined as consistent, otherwise, a comparison unit determines the color coordinate value S(x, y) of the color information and the color coordinate value S'(x', y') of the anti-spoofing reference color information inconsistent.

It should be further noted that the anti-spoofing reference interval can be generated through big data analysis of classification, statistics, and generalization of fingerprint images of a large number of real fingers, but the present invention is not limited hereto.

It is worth mentioning that, according to the image sensing method of the present invention, the registration step $S_6$ can be one-time or multiple-time registration, in other words, the image sensing method provided by the present invention can repeatedly execute the aforementioned reference sensing step $S_4$, the reference color calculation step $S_5$, and the registration step S6, and execution and principles are the same as those described above, and the description will be omitted here. Moreover, the image sensing method of the present invention can also execute the registration step $S_6$ only once. It is understandable that the image sensing method can store a large amount of anti-spoofing reference color information, so the anti-spoofing reference color information can be the average value of a plurality of anti-spoofing reference color information, as shown in the following formula (5). Moreover, the absolute value of the anti-spoofing reference interval can be the average value of the maximum value minus the minimum value in the anti-spoofing reference color information registered by the system, as shown in the following formula (6). It can be understood that the anti-spoofing reference interval of the present invention may be one half of the extreme difference, but the present invention is not limited hereto.

$$\left(\left(\frac{x_1 + x_2 + \ldots + x_n}{n}\right), \left(\frac{y_1 + y_2 + \ldots + y_n}{n}\right)\right), \quad (5)$$

$n$ is a positive integer $$\left(\left(\frac{\max \cdot x - \min \cdot x}{2}\right), \left(\frac{\max \cdot y - \min \cdot y}{2}\right)\right) \quad (6)$$

It is worth mentioning that the anti-spoofing reference interval can be an interval arbitrarily and manually set, and the absolute value of the anti-spoofing reference interval can be, but not limited to, one of 1, 2, or 3 times the standard deviation $\sigma$ of the anti-spoofing reference color information registered in the system. As shown in the following formula (8), the standard deviation $\sigma$ is calculated as shown in the following formula (7). According to the law of three-sigma, all values consistent with the anti-spoofing reference color information will fall within the range of plus or minus three standard deviations $\sigma$ of the anti-spoofing reference color information. Therefore, when the color coordinate value S(x, y) of the color information is within the anti-spoofing reference interval, the display device 1 can accurately determine the color coordinate value S(x, y) of the color information to be consistent with the color coordinate value S'(x', y') of the anti-spoofing reference color information, but the present invention is not limited hereto.

$$\sigma = \sqrt{\frac{1}{N}\sum_{i=0}^{n}(x_i - \mu)^2} \quad (7)$$

$$(a\sigma_x, a\sigma_y), \quad (8)$$

$a = 1$ or $2$ or $3$

As such, the image sensing method provided by the present invention can successfully provide a high-efficiency anti-spoofing recognition without increasing the production cost of the anti-spoofing recognition module.

First Embodiment

Hereinafter, an embodiment of the first embodiment of the display device 1 of the present invention will be described with reference to the drawings.

Figure 6:
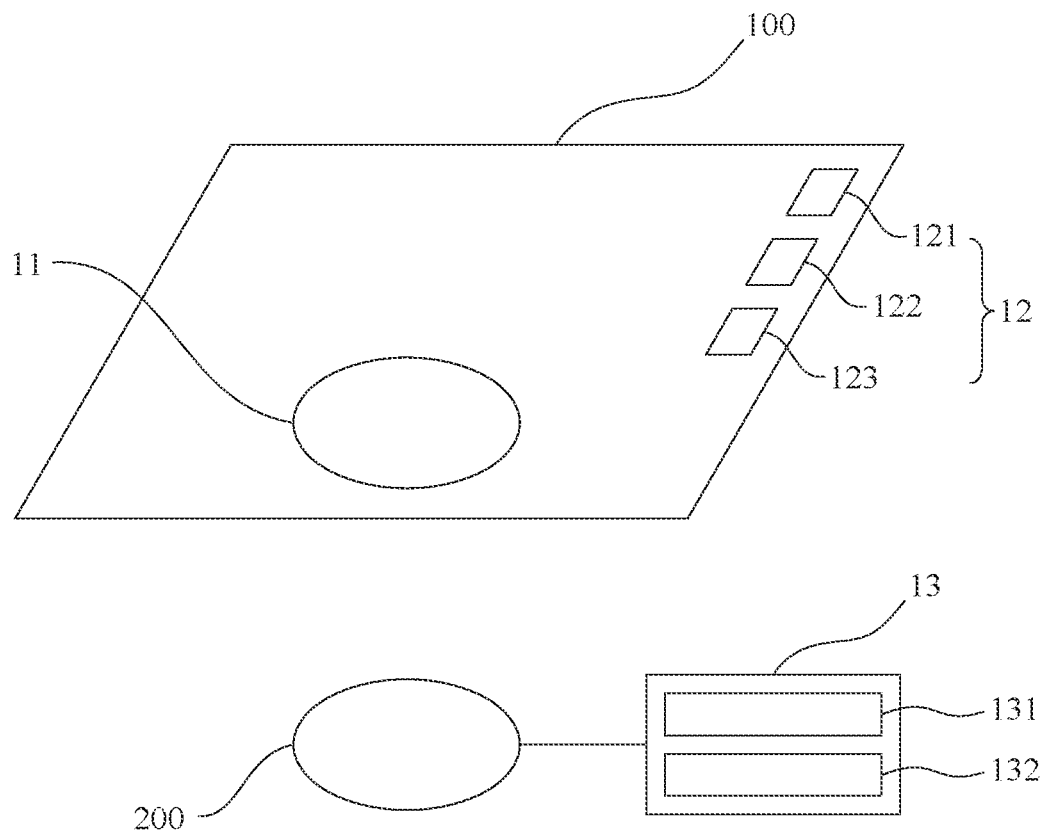
FIG. 6 is a schematic view of a display device according to the first embodiment of the present invention.

Refer to FIG. 6, which is a schematic view of a display device according to the first embodiment of the present invention. As shown in FIG. 6, the display device 1 according to the first embodiment of the present invention is applied to a fingerprint sensing system. The display device 1 includes: a display panel 100, a display area 11, a unit pixel 12, and an image sensor 200, a calculation unit 13, a storage unit 131, and a comparison unit 132.

Specifically, referring to FIG. 6, the display panel 100 according to the first embodiment of the present invention has a display area 11, the display area 11 includes a plurality of unit pixels 12, and the unit pixels 12 include red unit pixels 121, green unit pixels 122, and blue unit pixels 123, wherein the red unit pixels 121 emit red light R, the green unit pixels 122 emit green light G, and the blue unit pixels 123 emit blue light B. However, the present invention is not limited hereto.

Specifically, the image sensor 200 is disposed on the display panel 100, the image sensor 200 correspondingly overlaps the display area 11, and the image sensor 200 includes a plurality of sensing blocks 21, however the present invention is not limited hereto.

Figure 7:
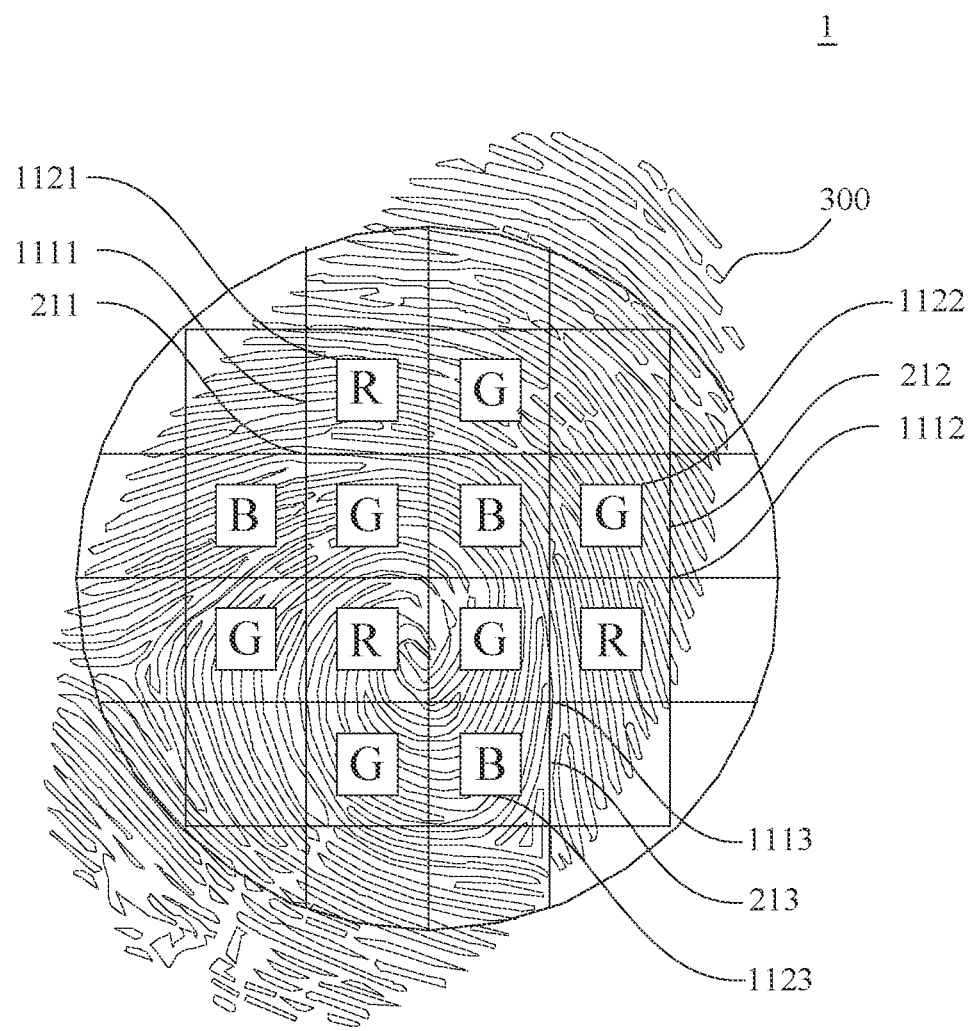
FIG. 7 is a schematic view of the image sensor according to the first embodiment of the present invention.

Refer to FIG. 7, which is a schematic view of the image sensor according to the first embodiment of the present invention. As shown in FIG. 7, the image sensor 200 is divided into a plurality of sensing blocks 21. The sensing blocks 21 include a first sensing block 211, a second sensing block 212, and a third sensing block 213. The display area 11 of the display panel 100 is divided into a plurality of display blocks 111 correspondingly according to the sensing blocks 21, wherein the display blocks 111 includes a first display block 1111, a second display block 1112, and a third display block 1113. Moreover, the first sensing block 211 corresponds to the first display block 1111, the second sensing block 212 corresponds to the second display block 1112, and the third sensing block 211 corresponds to the third display block 1113.

Specifically, referring to FIG. 7, the display area 11 includes one or more display blocks 111 corresponding to the sensing blocks 21, wherein the display blocks 111 include at least one light-emitting block 112. The area of the light-emitting block 112 is smaller than the area of the sensing block 21. In the present embodiment, the first sensing block 211 includes a first light-emitting block 1121, the second sensing block 212 includes a second light-emitting block 1122, and the third sensing block 213 includes a third light-emitting block 1123, however, the present invention is not limited hereto.

Specifically, the first display block 1111 includes only the red unit pixels 121 of the unit pixels 12, and the first sensing block 211 senses the first image light intensity generated by the first emitted light emitted from the first display block 1111 and reflected by the test object 300, so the first emitted light is defined as red light R. The color coordinate value of the first emitted light is represented by R($x_r$, $y_r$), and the first image light intensity is represented by $I_R$, but the present invention is not limited hereto.

Specifically, the second display block 1112 includes only the green unit pixels 122 of the unit pixels 12, and the second sensing block 212 senses the second image light intensity generated by the second emitted light emitted from the second display block 1112 and reflected by the test object 300, so the second emitted light is defined as green light G. The color coordinate value of the second emitted light is represented by G($x_g$, $y_g$), and the second image light intensity is represented by $I_G$, but the present invention is not limited hereto.

Specifically, the third display block 1113 includes only the blue unit pixels 123 of the unit pixels 12, and the third sensing block 213 senses the third image light intensity generated by the third emitted light emitted from the third display block 1113 and reflected by the test object 300, so the third emitted light is defined as blue light B. The color coordinate value of the third emitted light is represented by B($x_b$, $y_b$), and the third image light intensity is represented by $I_B$, but the present invention is not limited hereto.

Specifically, the calculation unit 13 is coupled to the image sensor 200, the calculation unit 13 uses the first image light intensity $I_R$, the second image light intensity $I_G$, and the third image light intensity $I_B$ and the following formula (9), formula (10), and formula (11) to calculate a first light-receiving ratio a, the second light-receiving ratio b, and the third light-receiving ratio c. However, the present invention does not limited hereto.

$$R(a)=I_R/(I_R+I_G+I_B) \tag{9}$$

$$G(b)=I_G/(I_R+I_G+I_B) \tag{10}$$

$$B(c)=I_B/(I_R+I_G+I_B) \tag{11}$$

Specifically, the calculation unit 13 uses the color coordinate value R($x_r$, $y_r$) of the first emitted light and the first light-receiving ratio a, and the color coordinate value G($x_g$, $y_g$) of the second emitted light and the second light-receiving ratio b, and the color coordinate value B($x_b$, $y_b$) of the third emitted light and the third light-receiving ratio c, and the following formula (12) and formula (13), to calculate the color information S(x, y), but the invention is not limited hereto.

$$x=ax_r+bx_g+cx_b \tag{12}$$

$$y=ay_r+by_g+cy_b \tag{13}$$

It should be further noted that the display device 1 according to the first embodiment of the present invention can use a reference object, so that the first sensing block 211 senses a first reference image light intensity $I_R'$ generated by the first emitted light R($x_r$, $y_r$) emitted to and reflected by the reference object; the second sensing block 212 senses a second reference image light intensity $I_G'$ generated by the second emitted light G($x_g$, $y_g$) emitted to and reflected by the reference object; and the third sensing blocks 213 sense a third reference image light intensity $I_B'$ generated by the third emission light B($x_b$, $y_b$) emitted to and reflected by the reference object. The calculation unit 13 is used in conjunction with the above formula (9), formula (10), and formula (11) to calculate the first light-receiving ratio a, the second light-receiving ratio b, and the third light-receiving ratio c. Finally, based on the color coordinate value R($x_r$, $y_r$) of the first emitted light and the first light-receiving ratio a, the color coordinate value G($x_g$, $y_g$) of the second emitted light and the second light-receiving ratio b, and the color coordinate value B($x_b$, $y_b$) of the third emitted light and the third light-receiving ratio c, the above formula (12) and formula (13) are used to calculate the color coordinate value S'(x', y') of the anti-spoofing reference color information, but the present invention is not limited hereto.

Specifically, the storage unit 131 of the first embodiment of the present invention is used to store the color coordinate value S'(x', y') of the anti-cspoofing reference color information and the color coordinate value S(x, y) of the color information. The storage unit 131 may be a volatile memory, or a non-volatile memory. Specifically, the volatile memory can be static random access memory (SRAM), dynamic random access memory (DRAM), synchronous dynamic random-access memory (SDRAM), double data rate synchronous dynamic random access memory (DDR SDRAM), and so on, but the present invention is not limited hereto.

Specifically, the comparison unit 132 is coupled to the storage unit 131, and the comparison unit 132 generates an anti-spoofing reference interval according to the anti-spoofing reference color information. Thereby, whenever the user needs to perform unlocking, the comparison unit 132 uses the color coordinate value S'(x', y') of the anti-spoofing reference color information as a reference to perform calculations through the following formula (14), and to determine through the following formula (15); wherein when the color information S(x, y) is in the anti-spoofing reference interval, the image sensor 100 determines the color coordinate value S(x, y) of the color information and the color coordinate value S'(x', y') of the anti-spoofing reference color information are consistent; otherwise, the image sensor 100 determines that the color coordinate value S(x, y) of the color information is not consistent with the color coordinate value S'(x', y') of the anti-spoofing reference color information.

$$S'-S=(x'-x, y'-y) \quad (14)$$

$$|S'-S| \leq \text{anti-spoofing reference interval} \quad (15)$$

It should be further noted that, in the present embodiment, the absolute value of the anti-spoofing reference interval may be the average value of the maximum value minus the minimum value in the anti-spoofing reference color information registered in the system. Alternatively, the absolute value of the anti-spoofing reference interval can be one of 1, 2, and 3 times of the standard deviation σ of the anti-spoofing reference color information registered in the system. It should be understood that when the color coordinate value S(x, y) and the color coordinate value S'(x', y') of the anti-spoofing standard color information are consistent, after the color coordinate value S'(x', y') of the anti-spoofing standard color information minus the color coordinate value S(x, y) of the color information, the x coordinate and the y coordinate will be less than the average value of the maximum minus the minimum value or 1 to 3 times of the standard deviation σ, but the present invention is not limited hereto.

Figure 8:
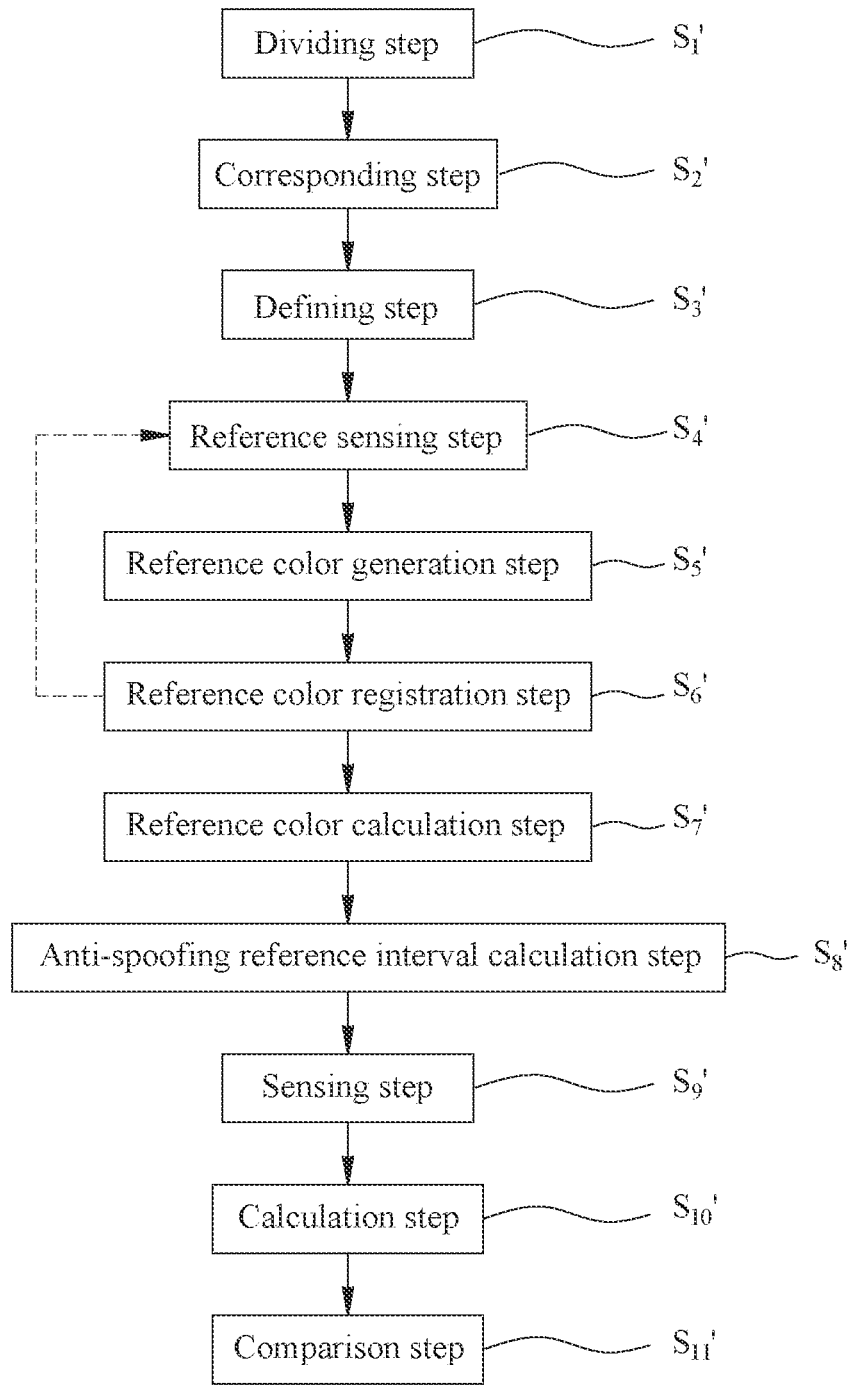
FIG. 8 is a flowchart illustrating the steps of performing the image sensing method according to the first embodiment of the present invention.

Refer to FIG. 8. FIG. 8 is a flowchart illustrating the steps of performing the image sensing method according to the first embodiment of the present invention. As shown in FIG. 8, the present invention further provides an image sensing method, which can be applied to the display device 1 of the first embodiment, and the image sensing method includes the following steps:

Dividing step $S_1$': dividing the image sensor 200 into a plurality of sensing blocks 21; and proceed to corresponding step $S_2$'.

Corresponding step $S_2$': correspondingly dividing the display area 11 of the display 100 into a plurality of display blocks 111 according to a plurality of sensing blocks 21, the display block 111 comprising at least one light-emitting block 112, the area of the light-emitting block 112 being smaller than the area of the sensing block 21; and proceed to defining step $S_3$'.

Defining step $S_3$': defining a luminous color of each display block 111 and a color coordinate value of the luminous color of each display block 111; and proceed to reference sensing step $S_4$'.

Reference sensing step $S_4$': the plurality of display blocks 111 emitting light at the same time, and then each of the sensing blocks 21 sensing a reference image light intensity of the light reflected to the sensing blocks 21 from each of the display blocks 111 emitting light unto a reference object and reflected to the sensing blocks 21; and proceed to reference color generation step $S_5$'.

Reference color generation step $S_5$': generating an anti-spoofing reference color information from the color coordinate value and the reference image light intensity; and proceed to reference color registration step $S_6$'.

Reference color registration step $S_6$': registering the anti-spoofing reference color information into a system, and proceed to reference color calculation step $S_7$'.

Reference color calculation step $S_7$': calculating the average of the color coordinate value S(x, y) of a plurality of color information and the color coordinate value S'(x', y') of the anti-spoofing reference color information stored in the storage unit 131 together with the anti-spoofing reference color information as the anti-spoofing reference color information; and proceed to the anti-spoofing reference interval calculation step $S_8$'.

Anti-spoofing reference interval calculation step $S_8$': using the anti-spoofing reference color information to generate an anti-spoofing reference interval; and proceed to sensing step $S_9$'.

Sensing step $S_9$': the plurality of display blocks 111 emitting light at the same time, and the sensing blocks 21 obtaining an image light intensity of an image reflected to the sensing blocks 21 from the display blocks 111 emitting light unto and reflected by a test object; and proceed to calculation step $S_{10}$'.

Calculation step $S_{10}$': generating a color information from the color coordinate value and the image light intensity; and proceed to comparison step $S_{11}$'.

Comparison step $S_{11}$': determining the color information and the anti-spoofing reference color information being consistent when the color information being within the anti-spoofing reference interval, otherwise determining the color information being inconsistent with the anti-spoofing reference color information.

For example, refer to FIG. 6, as well as FIG. 5. First, the dividing step $S_1$' is executed to divide the image sensor 200 into a plurality of sensing blocks 21. The sensing blocks 21 include the first sensing block 211, the second sensing block 212 and the third sensing block 213; then the corresponding step $S_2$' is executed to divide the display area 11 of the display panel 100 correspondingly into a plurality of display blocks 111 according to the sensing blocks 21. The display block 111 includes a first display block 1111, a second display block 1112, and a third display block 1113. The first sensing area block 211 corresponds to the first display block 1111, the second sensing block 212 corresponds to the second display block 1112, and the third sensing block 213 corresponds to the third display block 1113. Then, the definition step $S_3$' is executed. The first display block 1111 containing only the red unit pixel 121 emits the first emitted light, defined as red light and the color coordinate value of the first emitted light as $R(x_r, y_r)$, the second light emitted by the second display block 1112 containing only the green unit pixel 122 is defined as green light, and the color coordinate value of the second emitted light is $G(x_g, y_g)$, and the third light emitted by the third display block 1113 containing only the blue unit pixel 123 is defined as blue light, and the color coordinate value of the third emitted light is $B(x_b, y_b)$. The reference sensing step $S_4$' is then performed. The first display block 1111, the second display block 1112 and the third display block emit light at the same time, and the first sensing block 211 senses the first reference image light intensity $I_R$ generated by the reference object reflecting the first emitted light emitted by the first display block 1111, the second sensing block 212 senses the second reference image light intensity $I_G'$ generated by the reference object reflecting the second emitted light emitted by the second display block 1112, and the third sensing block 213 senses the third reference image light intensity $I_B'$ generated by the reference object reflecting the third emitted light emitted by the third display block 1113. Then, the reference color generation step $S_5'$ is performed, wherein the color coordinate value $R(x_r, y_r)$ of the first emitted light, the color coordinate value $G(x_g, y_g)$ of the second emitted light, the color coordinate value $B(x_b, y_b)$ of the third emitted light, the first reference image light intensity $I_R'$ generated by the first sensing block 211, the second reference image light intensity $I_G'$ generated by the second sensing block 212, and the third reference image light intensity $I_B'$ generated by the third sensing block 213, are used in the calculation according to the above formula (9) to formula (13) to generate the anti-spoofing reference color information. Then, the reference color registration step S6' is executed to store the color coordinate value $S'(x', y')$ of the anti-spoofing reference color information in the storage unit 131; followed by the reference color calculation step $S_7'$ to calculate the average of the color coordinate value $S(x, y)$ of a plurality of color information, and the color coordinate value $S'(x', y')$ of the anti-spoofing reference color information stored the storage unit 131, together with the anti-spoofing reference color information using the above formula (5) as the anti-spoofing reference color information. Then, the anti-spoofing reference interval calculation step $S_8'$ is performed wherein the anti-spoofing reference interval is calculated by least one of combination of the above formula (6) to formula (8) according to the anti-spoofing reference color information.

Then, the sensing step $S_9'$ is executed, wherein the first display block 1111, the second display block 1112, and the third display block 1113 emit light at the same time, and the first sensing block 211 senses the first reference image light intensity $I_R$ generated by the test object 300 reflecting the first emitted light emitted by the first display block 1111, the second sensing block 212 senses the second reference image light intensity $I_G$ generated by the test object 300 reflecting the second emitted light emitted by the second display block 1112, and the third sensing block 213 senses the third reference image light intensity $I_B$ generated by the test object 300 reflecting the third emitted light emitted by the third display block 1113. The calculation step $S_{10}'$ is then performed, wherein the color coordinate value $R(x_r, y_r)$ of the first emitted light, the color coordinate value $G(x_g, y_g)$ of the second emitted light, the color coordinate value $B(x_b, y_b)$ of the third emitted light, the first reference image light intensity $I_R$ generated by the first sensing block 211, the second reference image light intensity $I_G$ generated by the second sensing block 212, and the third reference image light intensity $I_B$ generated by the third sensing block 213 are used in the calculation according to the above formula (9) to formula (13) to generate the color information, and the color coordinate value $S(x, y)$ of the color information. Finally, in the comparison step $S_{11}'$, according to the above formula (14), when the color coordinate value $S(x, y)$ of the color information is within the anti-spoofing reference interval, the color coordinate value $S(x, y)$ of the color information and the color coordinate value $S'(x', y')$ of the anti-spoofing reference color information are determined as consistent, otherwise, a comparison unit determines the color coordinate value $S(x, y)$ of the color information and the color coordinate value $S'(x', y')$ of the anti-spoofing reference color information inconsistent.

It should be further noted that the anti-spoofing reference interval can be generated through big data analysis of classification, statistics, and generalization of fingerprint images of a large number of real fingers, but the present invention is not limited hereto.

It is worth mentioning that, according to the image sensing method of the present invention, the registration step $S_6'$ can be one-time or multiple-time registration, in other words, the image sensing method provided by the present invention can repeatedly execute the aforementioned reference sensing step $S_4'$, the reference color calculation step $S_5'$, and the registration step $S_6'$, and execution and principles are the same as those described above, and the description will be omitted here. Moreover, the image sensing method of the present invention can also execute the registration step $S_6$ only once. It is understandable that the image sensing method can store a large amount of anti-spoofing reference color information, so the anti-spoofing reference color information can be the average value of a plurality of anti-spoofing reference color information, but the present invention is not limited hereto.

It is worth mentioning that the anti-spoofing reference interval can be an interval arbitrarily and manually set, or the anti-spoofing reference interval can be the difference between the maximum value and the minimum value and the average value in the anti-spoofing reference color information registered in the system, but the present invention is not limited hereto.

As such, based on the display device 1 of the first embodiment of the present invention and combined with the image sensing method provided by the present invention, it is possible to obtain, with only one run of image sensing, the reference image and the image light intensity of image of the test object under the first emitted light $R(x_r, y_r)$, the second emitted light $G(x_g, y_g)$, and the third emitted light $B(x_b, y_b)$, and by the calculation of the calculation unit 13 to generate the anti-spoofing reference color information and color information. Finally, the comparison unit determines whether the color of the test object and the reference object are consistent to achieve the purpose of anti-spoofing, providing a high-performance anti-spoofing recognition.

The following provides other examples of the display device 1, so that a person with ordinary knowledge in the technical field to which the present invention belongs can understand possible changes more clearly. The elements indicated by the same reference numerals as in the foregoing embodiment are substantially the same as those described above with reference to FIGS. 5 and 6. The elements, features, and advantages that are the same as those of the display device 1 will not be repeated.

Second Embodiment

Hereinafter, the second embodiment of the display device 1 of the present invention will be described with reference to the drawings.

Figure 9:
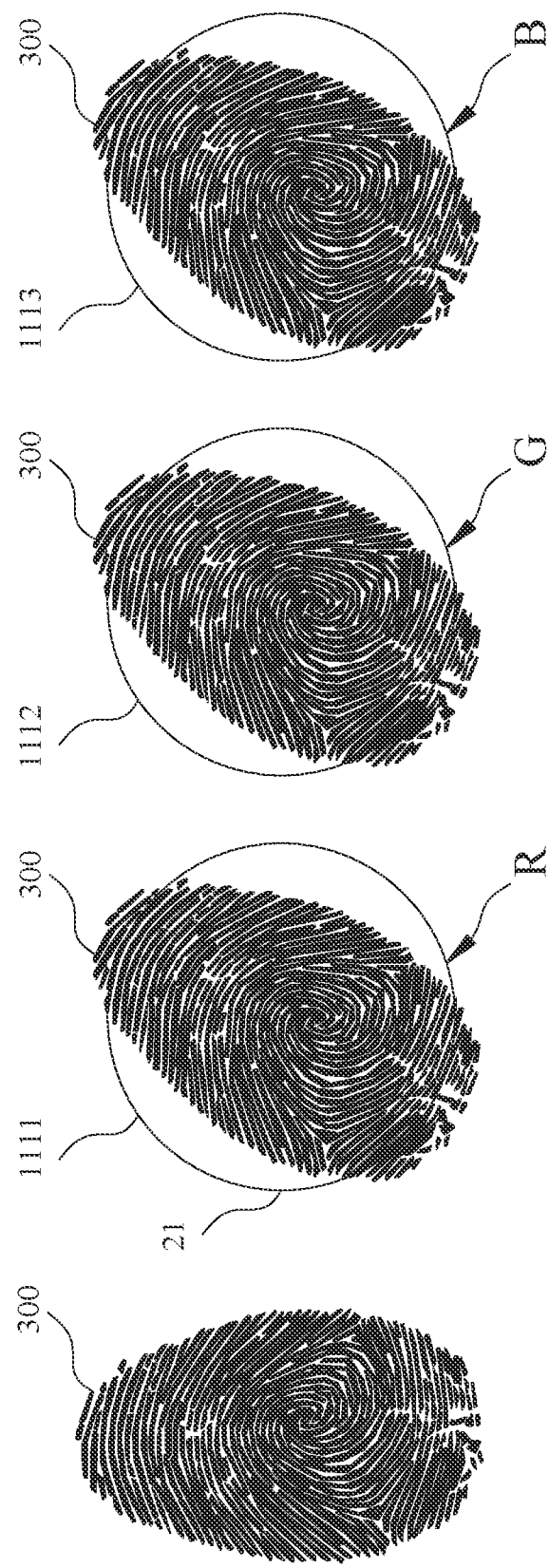
FIG. 9 is a schematic view of a display device according to a second embodiment of the present invention.

Refer to FIG. 9, which is a schematic view of a display device according to a second embodiment of the present invention. Compared with the first embodiment, the second embodiment differs from the first embodiment in that, in the second embodiment of the present invention, the image sensor 200 is divided into a sensing block 21, and the display area 11 is divided into a first display block 1111, a second display block 1112, and a third display block 1113, which respectively correspond the red unit pixels 121, the green unit pixels 122, and the blue unit pixels 123; in other words, the first display block 1111 includes all the red unit pixels 121 in the display area 11, the second display block 1112 includes all the green unit pixels 122 in the display area 11, and the third display block 1113 includes all the blue unit pixels 123 in the display area 11. The display block 111 sequentially emits the first emitted light, the second emitted light, and the third emitted light.

Specifically, refer to FIG. 9. First, the sensing block 21 senses the first image light intensity from the first emitted light emitted by the first display block 1111 and reflected by the test image 200, thus defining the first emitted light as red light R, the color coordinate value of the first emitted light is represented by R($x_r$, $y_r$), and the first image light intensity is represented by $I_R$. Then, the sensing block 21 senses the second image light intensity from the second emitted light emitted by the second display block 1112 and reflected by the test image 200, thus defining the second emitted light as green light G, the color coordinate value of the second emitted light is represented by G($x_g$, $y_g$), and the second image light intensity is represented by $I_G$. Finally, the sensing block 21 senses the third image light intensity from the third emitted light emitted by the third display block 1113 and reflected by the test image 200, thus defining the third emitted light as blue light B, the color coordinate value of the third emitted light is represented by B($x_b$, $y_b$), and the third image light intensity is represented by $I_B$. However, the present invention is not limited hereto. It can be understood that the materials and other characteristics used in the image sensor 100 according to the second embodiment of the present invention are similar to those of the image sensor 100 according to the first embodiment of the present invention, and the details will not be repeated here.

It should be further noted that the display block 111 according to the second embodiment of the present invention includes at least one light-emitting block 112, wherein the area of the light-emitting block 112 is not limited to the area of the sensing block 21, and the light-emitting block 112 may be larger than the area of the sensing block 21, but the present invention is not limited hereto.

It is worth mentioning that the number of the unit pixels 12, such as, the red light unit pixels 121, the green light unit pixels 122, and the blue light unit pixels 123, included in the current display devices on the market may not be the same, due to the consideration of efficiency and service life. For the convenience of description, the following description will take the number of green unit pixels 122 to be twice that of red unit pixels 121 and blue unit pixels 123, which is only an exemplary description, but the present invention is not limited hereto.

Specifically, the calculation unit 13 of the second embodiment of the present invention is coupled to the image sensor 200, the calculation unit 13 uses the first image light intensity $I_R$, the second image light intensity $I_G$, and the third image light intensity $I_B$ with the following formula (16), formula (17), and formula (18) to calculate the first light-receiving ratio a, the second light-receiving ratio b, and the third light-receiving ratio c. However, the present invention is not limited hereto. It can be understood that the parameters in the following formulas can be adjusted according to the numbers of red unit pixels 121, green unit pixels 122, and blue unit pixels 123. The following is an exemplar according to the condition that the number of green unit pixels 122 is twice of the red unit pixels 121 and the blue unit pixels 123 as described. Those skilled in the art can make various changes and adjustments according to the following formulas, which will not be listed here.

$$R(a)=I_R/(I_R+2*I_G+I_B) \quad (16)$$

$$2*G(b)=2*I_G/(I_R+2*I_G+I_B) \quad (17)$$

$$B(c)=I_B/(I_R+2*I_G+I_B) \quad (18)$$

Specifically, the calculation unit 13 is based on the color coordinate value R($x_r$, $y_r$) of the first emitted light and the first light receiving ratio a, the color coordinate value G($x_g$, $y_g$) and the second light-receiving ratio b, and the color coordinate value of the third emitted light B($x_b$, $y_b$) and the third light-receiving ratio c, and uses the following formula (19) and formula (20) to calculate the color information S(x, y). However, the present invention is not limited hereto.

$$x=ax_r+bx_g+cx_b \quad (19)$$

$$y=ay_r+by_g+xy_b \quad (20)$$

As such, the image sensor 100 according to the second embodiment of the present invention can also achieve the effects of the first embodiment while providing different structures. In terms of effect, the color information S(x, y) generated according to the second embodiment of the present invention has better resolution. In addition, the second embodiment can overcome the potential problem of the mutual influence among the first sensing block 211, the second sensing and the third sensing block 213 to cause the risk of deviation of the color information S(x, y) in the first embodiment. However, the disadvantage of the second embodiment is that multiple image sensing runs must be performed, and the user can determine which approach to adopt depending on the application needs, but the present invention is not limited hereto.

Figure 10:
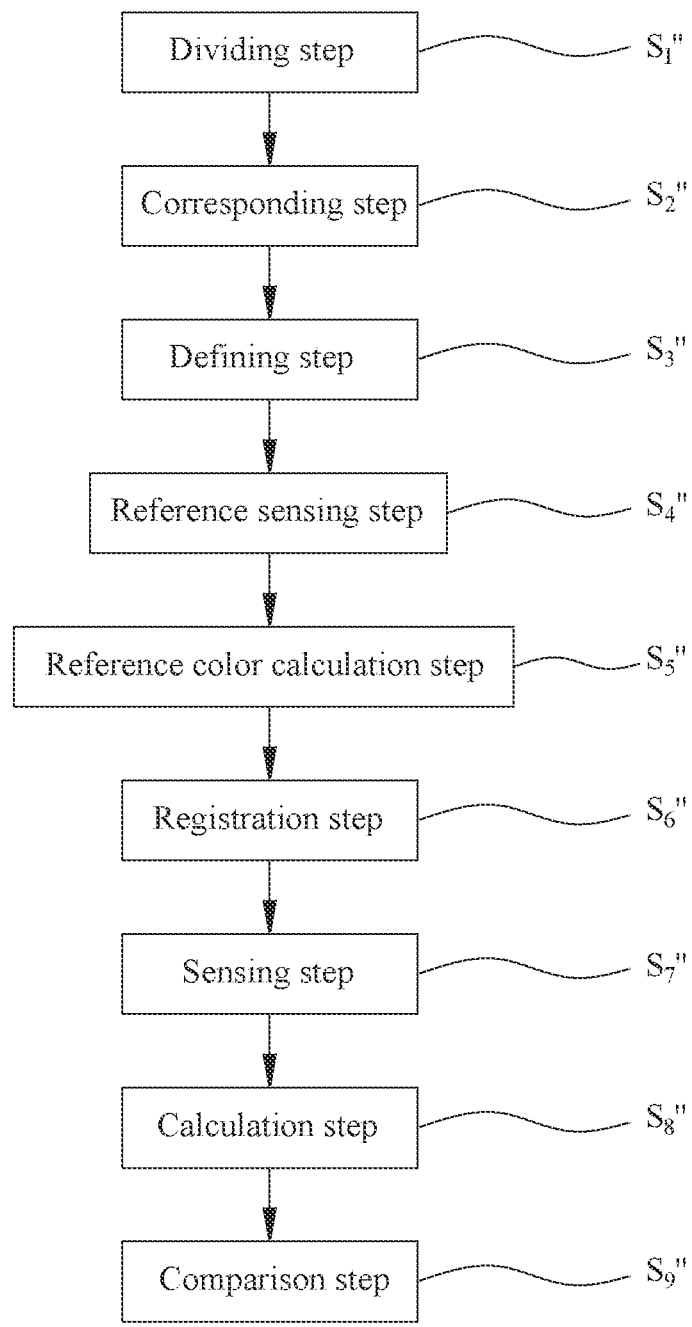
FIG. 10 is a flowchart illustrating the steps of performing the image sensing method according to the second embodiment of the present invention.

To provide a further understanding of the structural features, technical means and expected effects of the second embodiment of the present invention, the use of the present invention is described. It is believed that a deeper and specific understanding of the present invention can be obtained from the description below:

Refer to FIG. 10, which is a flowchart illustrating the steps of the image sensing method of the second embodiment of the present invention. As shown in FIG. 10, the present invention further provides an image sensing method, applicable to the aforementioned display device 1 of the second embodiment. The image sensing method includes the following steps:

Dividing step $S_1''$: dividing the image sensor 200 into one or more sensing blocks 21; and proceed to corresponding step $S_2''$.

Corresponding step $S_2''$: correspondingly dividing the display area 11 of the display 100 into a plurality of display blocks 111 according to the sensing block 21; and proceed to defining step $S_3''$.

Defining step $S_3''$: defining each luminous color and defining a color coordinate value of the luminous color of each display block 111; and proceed to reference sensing step $S_4''$.

Reference sensing step $S_4''$: teach display block 111 emitting light sequentially, and then the sensing block 21 sequentially sensing a reference image light intensity of each light reflected to the sensing block 21 from the display block 111 emitting light unto a reference object and reflected to the sensing block 21; and proceed to reference color calculation step $S_5''$.

Reference color calculation step $S_5''$: generating an anti-spoofing reference color information from the color coordinate value and the reference image light intensity; and proceed to registration step $S_6''$.

Registration step $S_6''$: registering the anti-spoofing reference color information into a system, and using the anti-spoofing reference color information to generate an anti-spoofing reference interval; and proceed to sensing step $S_7''$.

Sensing step $S_7$": each display block 111 emitting light sequentially, and the sensing block 21 sequentially obtaining an image light intensity of the image reflected to the sensing block 21 from each display block 111 emitting light unto and reflected by a test object; and proceed to calculation step $S_8$".

Calculation step $S_8$": generating a color information from the color coordinate value and the image light intensity; and proceed to comparison step $S_9$".

Comparison step $S_9$": determining the color information and the anti-spoofing reference color information being consistent when the color information being within the anti-spoofing reference interval, otherwise determining the color information being inconsistent with the anti-spoofing reference color information.

For example, refer to FIG. 8, as well as FIG. 7. First, the dividing step $S_1$" is executed to divide the image sensor 200 into one sensing block 21; then the corresponding step $S_2$" is executed to divide the display area 11 of the display panel 100 into a first display block 1111 including red unit pixels 121, a second display block 1112 including green unit pixels 122, and a third display block 1113 including blue unit pixels 123. Then, the definition step $S_3$" is executed. The first display block 1111 containing only the red unit pixel 121 emits the first emitted light, defined as red light and the color coordinate value of the first emitted light as $R(x_r, y_r)$, the second light emitted by the second display block 1112 containing only the green unit pixel 122 is defined as green light, and the color coordinate value of the second emitted light is $G(x_g, y_g)$, and the third light emitted by the third display block 1113 containing only the blue unit pixel 123 is defined as blue light, and the color coordinate value of the second emitted light is $G(x_b, y_b)$. The reference sensing step $S_4$" is then performed. The first display block 1111, the second display block 1112, and the third display block 1113 emit light sequentially, wherein the sensing block 21 senses the first reference image light intensity $I_R$ generated by the reference object reflecting the first emitted light emitted by the first display block 1111, then the sensing block 21 senses the second reference image light intensity $I_G'$ generated by the reference object reflecting the second emitted light emitted by the second display block 1112, and then the sensing block 21 senses the third reference image light intensity $I_B'$ generated by the reference object reflecting the third emitted light emitted by the third display block 1113. Then, the reference color calculation step $S_5$" is performed, wherein the color coordinate value $R(x_r, y_r)$ of the first emitted light, the color coordinate value $G(x_g, y_g)$ of the second emitted light, the color coordinate value $B(x_b, y_b)$ of the third emitted light, the first reference image light intensity $I_R'$, the second reference image light intensity $I_G'$, and the third reference image light intensity $I_B'$ generated by the sensing block 21, are used in the calculation according to the above formula (16) to formula (20) to generate the anti-spoofing reference color information, and the color coordinate value $S'(x', y')$ of the anti-spoofing reference color information. Then, the registration step $S_6$" is executed to register the color coordinate value $S'(x', y')$ of the anti-spoofing reference color information to the system, and generates an anti-spoofing reference interval based on the color coordinate value $S'(x', y')$ of the anti-spoofing reference color information. Then, the sensing step $S_7$" is executed, wherein the first display block 1111, the second display block 1112, and the third display block 1113 emit light sequentially, and the sensing block 21 senses the first reference image light intensity $I_R$ generated by the test object 200 reflecting the first emitted light emitted by the first display block 1111, then the sensing block 21 senses the second reference image light intensity $I_G$ generated by the test object 200 reflecting the second emitted light emitted by the second display block 1112, and then the sensing block 21 senses the third reference image light intensity $I_B$ generated by the test object 200 reflecting the third emitted light emitted by the third display block 1113. The calculation step $S_8$" is then performed, wherein the color coordinate value $R(x_r, y_r)$ of the first emitted light, the color coordinate value $G(x_g, y_g)$ of the second emitted light, the color coordinate value $B(x_b, y_b)$ of the third emitted light, the first reference image light intensity $I_R$, the second reference image light intensity $I_G$, and the third reference image light intensity $I_B$ generated by the sensing block 21, are used in the calculation according to the above formula (16) to formula (20) to generate the color information, and the color coordinate value $S(x, y)$ of the color information of the test object 200. Finally, in the comparison step $S_9$", when the color coordinate value $S(x, y)$ of the color information is within the anti-spoofing reference interval, the color coordinate value $S(x, y)$ of the color information and the color coordinate value $S'(x', y')$ of the anti-spoofing reference color information are determined as consistent, otherwise, a comparison unit determines the color coordinate value $S(x, y)$ of the color information and the color coordinate value $S'(x', y')$ of the anti-spoofing reference color information inconsistent.

It can be understood that those with ordinary knowledge in the technical field to which the present invention belongs can make various changes and adjustments based on the above examples, which will not be listed here.

Finally, the technical features of the present invention and its achievable technical effects are summarized as follows:

First, based on the display device 1, combined with the image sensing method provided by the present invention, the present invention successfully provides a high-efficiency anti-spoofing recognition without increasing the production cost of the anti-spoofing recognition module.

Second, the image sensor 100 according to the present invention can obtain the first image light intensity $I_R$ and the second image light intensity $I_G$ of the object under the first emitted light and the second emitted light, and the calculation unit 15 calculates to generate color information $S(x, y)$ with sufficient anti-spoofing capability, thereby providing a high-efficiency anti-spoofing recognition.

Third, the image sensor 100 according to the second embodiment of the present invention can further improve, through multiple image sensing runs, the resolution of the image sensor 100 in a fingerprint recognition environment.

Although the present invention has been described with reference to the preferred embodiments thereto, it is apparent to those skilled in the art that a variety of modifications and changes may be made without departing from the scope of the present invention which is intended to be defined by the appended claims.

What is claimed is:

1. An image sensing method, applicable to anti-spoofing recognition of fingerprint recognition of the under screen of a display device, the display device having a display panel and an image sensor, the display panel having a display area, the image sensor correspondingly overlapping the display area; the image sensing method comprising the following steps:

a dividing step: dividing the image sensor into a plurality of sensing blocks;

a corresponding step: correspondingly dividing the display area into a plurality of display blocks according to a plurality of sensing blocks, the display block comprising at least one light-emitting block, the area of the light-emitting block being smaller than the area of the sensing block;

a defining step: defining a luminous color of each display block and a color coordinate value of the luminous color;

a reference sensing step: the plurality of display blocks emitting light at the same time, and then each of the sensing blocks sensing a reference image light intensity of the light reflected to the sensing blocks from each of the display blocks emitting light unto a reference object and reflected to the sensing blocks;

a reference color calculation step: generating an anti-spoofing reference color information from the color coordinate value and the reference image light intensity;

a registration step: registering the anti-spoofing reference color information into a system, and using the anti-spoofing reference color information to generate an anti-spoofing reference interval;

a sensing step: the plurality of display blocks emitting light at the same time, and the sensing blocks obtaining an image light intensity of an image reflected to the sensing blocks from the display blocks emitting light unto and reflected by a test object;

a calculation step: generating a color information from the color coordinate value and the image light intensity; and a comparison step: determining the color information and the anti-spoofing reference color information being consistent when the color information being within the anti-spoofing reference interval, otherwise determining the color information being inconsistent with the anti-spoofing reference color information.

2. The image sensing method according to claim 1, wherein the light-emitting block comprises a first light-emitting block and a second light-emitting block, and the luminous color of the first light-emitting block is selected from one of red light, green light, and blue light, and the luminous color of the second light-emitting block is selected from another of red light, green light, and blue light.

3. The image sensing method according to claim 2, wherein the display area further comprises a third light-emitting block, and the luminous color of the third light-emitting block is selected from one of the red light, green light, and blue light, and the luminous color of the third light-emitting block is different from luminous colors of the first light-emitting block and the second light-emitting block.

4. The image sensing method according to claim 1, wherein the registration step is a one-time or multiple-time registration to the system.

5. The image sensing method according to claim 1, wherein the anti-spoofing reference color is an average value of the anti-spoofing reference color information registered in the system.

6. The image sensing method according to claim 1, wherein the anti-spoofing reference interval is manually set.

7. The image sensing method according to claim 1, wherein the absolute value of the anti-spoofing reference interval is the average value of the maximum value minus the minimum value of the anti-spoofing reference color information registered by the system.

8. The image sensing method according to claim 1, wherein the absolute value of the anti-spoofing reference interval is one of 1 time, 2 times, and 3 times of standard deviation of the anti-spoofing reference color information registered by the system.

9. The image sensing method according to claim 1, wherein the display panel is one of an organic light-emitting diode (OLED) display panel and a micro light-emitting diode display panel.

* * * * *